Aug. 14, 1951     H. H. HOLLY     2,564,064
AUTOMATIC HAMBURGER PATTY MOLDING MACHINE
Filed Dec. 22, 1945     3 Sheets-Sheet 1
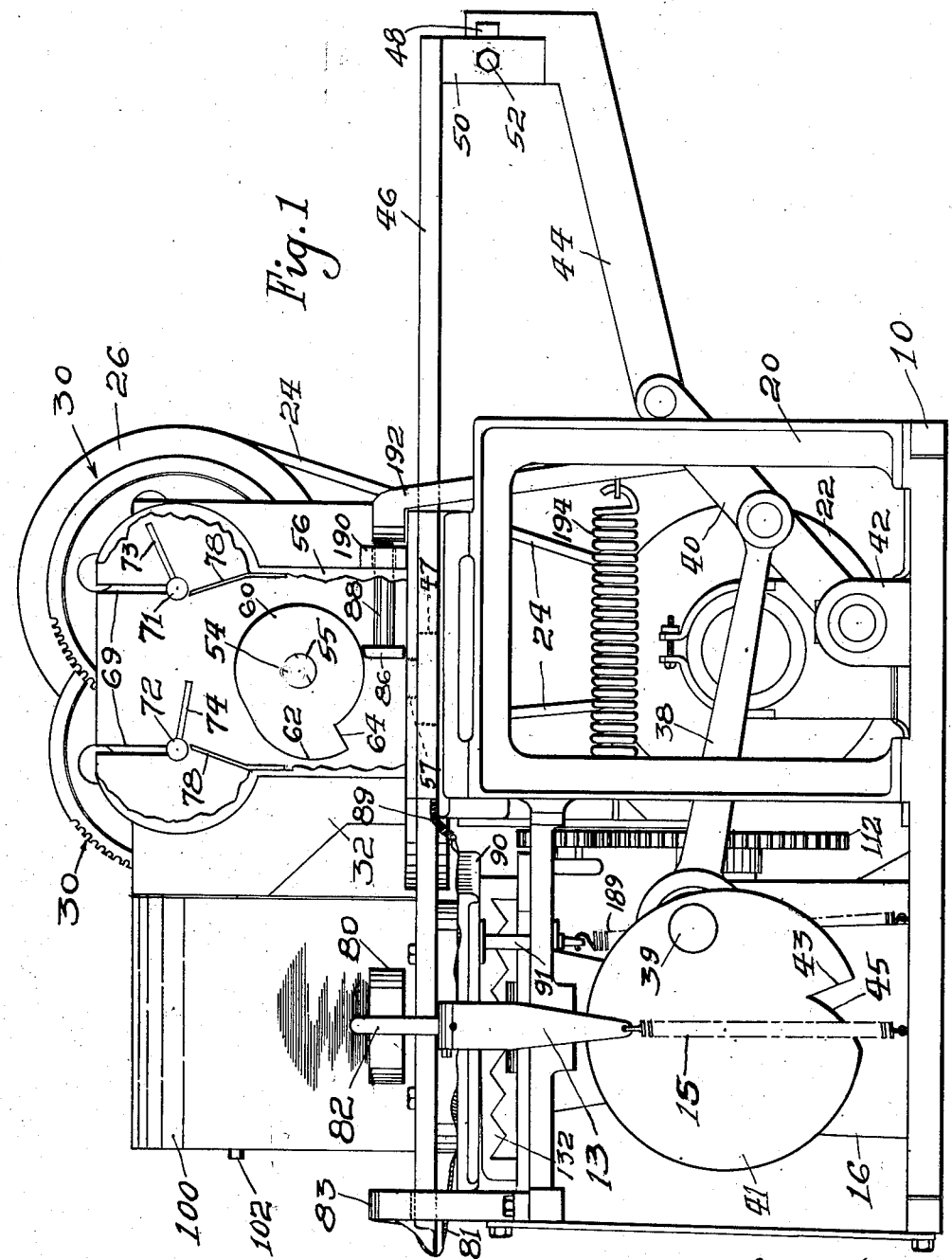
Inventor:
HARRY H. HOLLY
BY Albert J. Fike
Attorneys

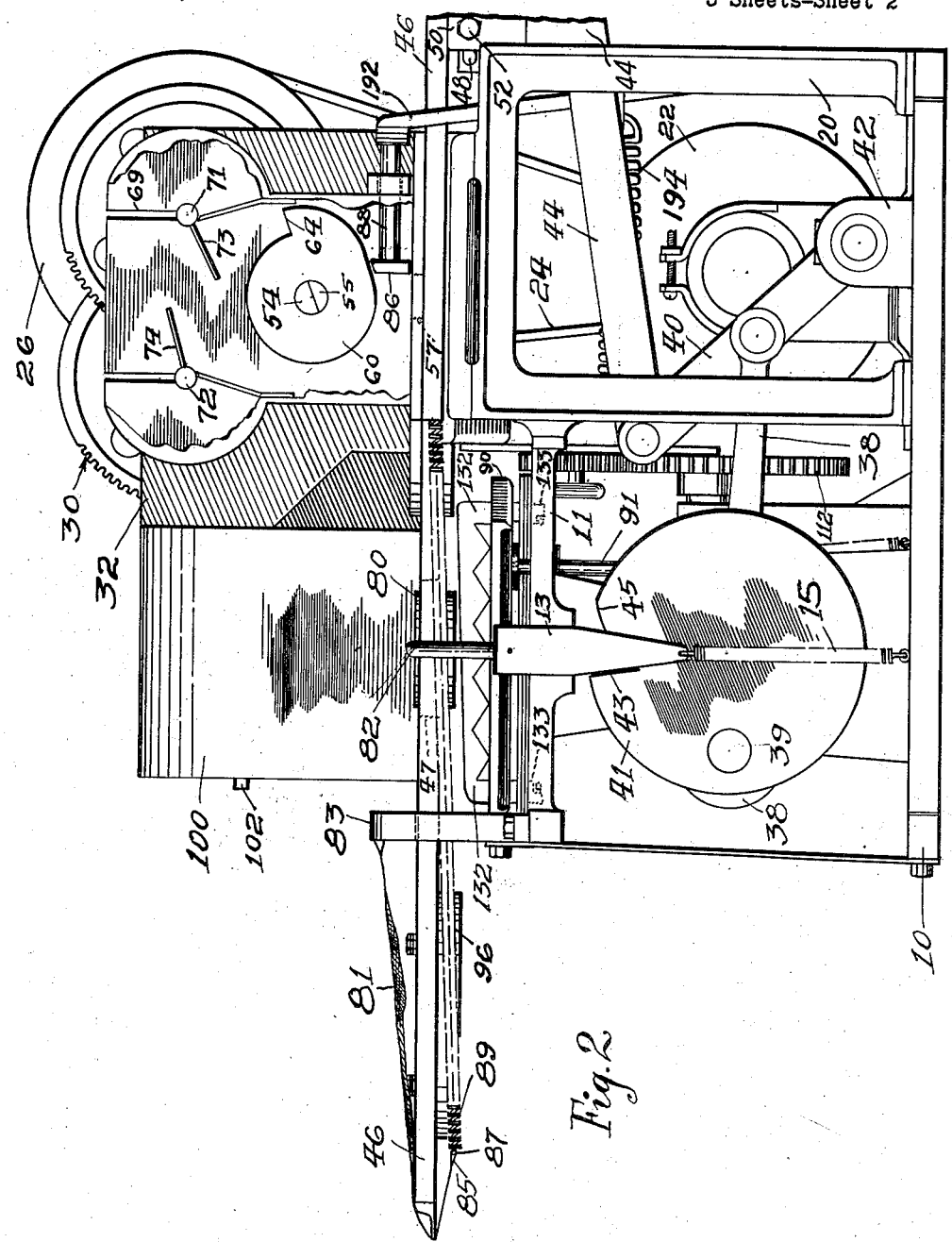

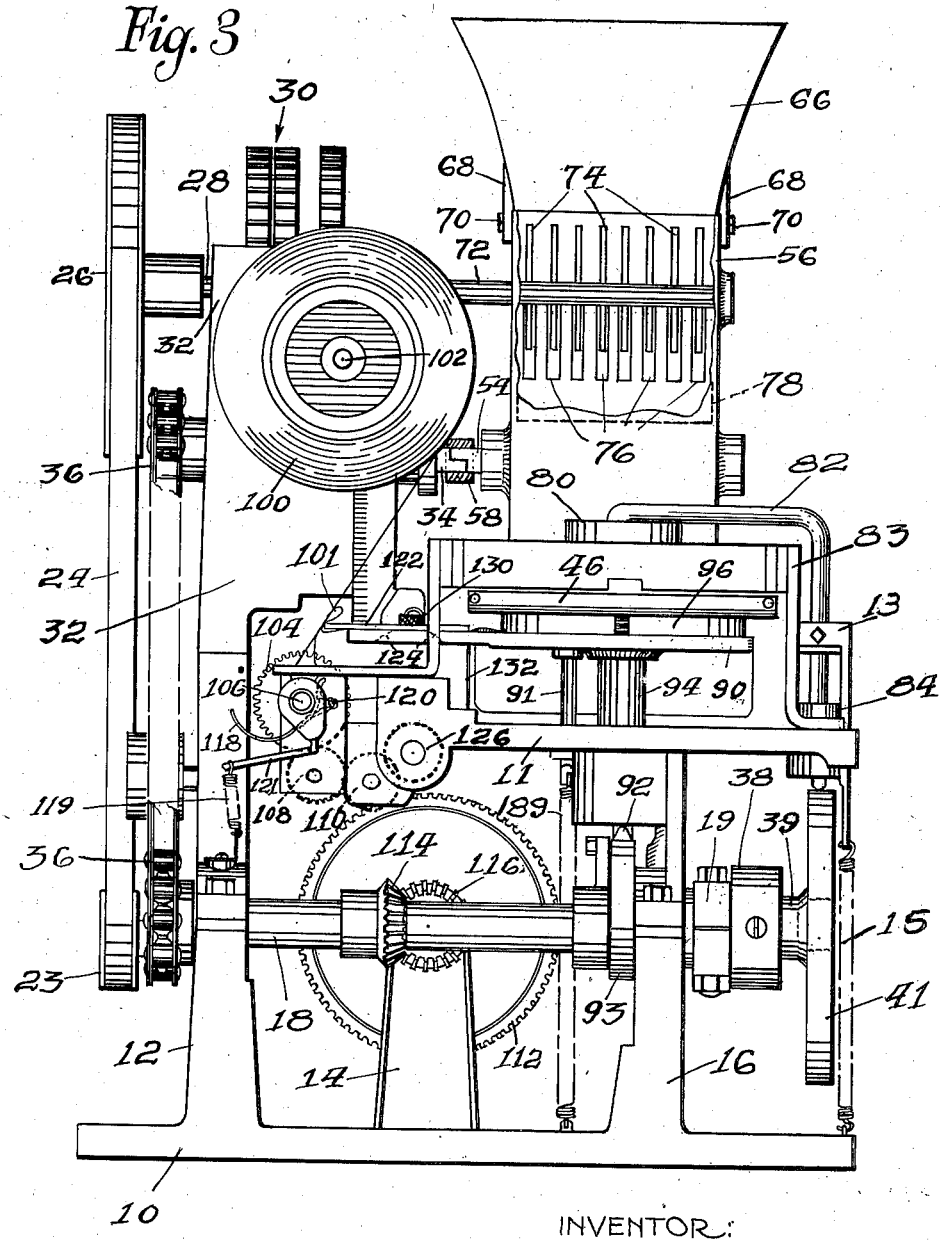

Patented Aug. 14, 1951

2,564,064

UNITED STATES PATENT OFFICE 2,564,064

AUTOMATIC HAMBURGER PATTY MOLDING MACHINE

Harry H. Holly, Chicago, Ill.

Application December 22, 1945, Serial No. 636,897

16 Claims. (Cl. 17—32)

This invention relates to an improved automatic electric hamburger patty molding machine and this particular invention contemplates improvements over my previously patented somewhat similar device entitled, "Automatic Portioning and Molding Mechanism," which patent was granted to me on January 11, 1944, No. 2,338,939.

The present invention also comprises improvements over the invention shown and described in my co-pending application for patent entitled, "Feed and Measuring Means for Plastic Material," filed July 9, 1943, Serial No. 493,997, now Patent 2,491,179, issued December 13, 1949.

This invention further includes an improvement over and is more closely related to my "Hamburger Patty Maker," for which I have also co-pending an application for patent, Serial No. 533,587, filed May 1, 1944, which has issued as Patent No. 2,413,046, dated December 24, 1946.

One of the important objects of this invention is to provide a hamburger patty molding machine which is entirely automatic and driven by an electric motor, or some other source of power, and which will speedily and efficiently produce meat patties of desired size and shape.

Another important object of the invention is to provide a machine for molding meat patties, wherein the previously ground meat is first placed in a hopper, from which it is automatically fed into a portioning mechanism, where the exact volume is determined, thence delivered into a molding means, whereby the portion is molded to the desired and exact size and shape, while at about the same time deposited upon an individual sheet of waxed paper, or the like, after which it is automatically ejected from the machine and placed on a stack of similar molded patties, each with its individual supporting sheet.

A still further and important object of the invention is to provide power driven means of the class described which will produce meat, fish, or other patties at a considerable rate of speed, namely, around 2,000 patties per hour, which will make the machine very desirable for use by large operators.

Other and further important objects of the invention will be apparent from the disclosures in the accompanying drawings and following specification.

The invention is illustrated in the drawings and hereinafter more fully described.

In the drawings:

Figure 1 is a side elevation of one embodiment of the improved automatic electric hamburger patty molding machine of this invention, showing the case, or cover, removed and also showing certain parts broken away to more clearly illustrate interior construction.

Figure 2 is a view similar to Figure 1, but showing the parts in a different operating position, parts being broken away.

Figure 3 is an end view of the machine illustrating the apparatus in approximately the same position of operation as shown in Figure 1. In this Figure also, the case is removed and certain parts are broken away for better illustrative purposes.

As shown in the drawings:

The reference numeral 10 indicates generally the base of the improved automatic hamburger patty molding machine of this invention, which base is surmounted by integral uprights 12, 14 and 16 (Figure 3). These uprights are for the purpose of supporting certain operating parts, more particularly the main drive shaft which is shown at 18 in Figure 3.

Also mounted on the base 10, by bolts or the like, is a plurality of upright supports or brackets, one of which is shown at 20, which brackets are for the purpose of supporting and positioning the upper portions of the mechanism and it will be obvious that the base 10 and brackets 20 can be cast into a unitary structure, if desired, or the whole may be formed into a combination base, supporting shell and case.

Referring to Figures 1 and 2 it will be noted that a motor 22 is mounted on the base 10 and this motor, through a suitable pulley 23 and belt 24, drives a larger pulley 26, which is mounted on a shaft 28, positioned in the upper part of the mechanism. The motor is adapted to rotate at a speed of around seventeen hundred and fifty revolutions per minute and by means of the pulley wheels and a set of gears 30 mounted in a gear box 32, will reduce the speed of the mechanism to somewhere between thirty and forty operations per minute.

A shaft 34 operating at this speed is mounted in the gear box 32 and protrudes from both the front and rear faces thereof, the rearward extension being provided with a sprocket which is driven by a chain 36, which chain in turn is driven by a similar sprocket mounted on the end of the main drive shaft 18 of the machine.

This main drive shaft includes an offset crank arm 19 upon which offset is mounted one end of a connecting rod 38. The offset includes a stub shaft 39 eccentrically fitted into a camplate 41.

The other end of the connecting rod 38 is attached to a lever or rocker arm 40, pivotally mounted at one end in an upright lug 42, which forms part of the base 10.

An L-shaped link 44 connects the free end of the lever 40 to the rear end of a reciprocating plate 46, which will hereinafter be designated as a "slide plate" and which forms an essential element of the portioning means of the invention. It will be noted that the link 44 has a longitudinal slot 48 at its connection with a lug 50, which extends downwardly from the rear end of the slide plate 46, this connection being made by means of a removable bolt 52. The slot 48 allows a certain amount of lost motion at each end of the reciprocatory movement of the slide plate 46, which movement is imparted thereto by means of the action of the heretofore described crank shaft, 18—19, connecting rod 38, lever 40 and link 44.

The other end of the shaft 34 which is mounted in the gear case 32 protrudes forwardly therefrom and is adapted to be removably connected to a cooperating extension shaft 54, which shaft extends through and forms part of the meat feeding mechanism which includes a case 56. It will be noted that the juxtaposed ends of the shafts 34 and 54 are cut away into unequal circular sections whereby they may be removably joined for driving connection with each other by means of a collar 58, which is mounted on the end of the shaft 34. The juxtaposed ends of the two shafts are so constructed that they can be fitted together inside the collar 58 in only one position, which insures correct timing of the respective operating parts of the entire mechanism, when the case or hopper 56 is replaced after being removed for cleaning.

The case 56 is broken away in the drawings to show the interior construction and it will be noted that the shaft 54 has removably, but non-rotatably, mounted thereon a feed element 60 (Figure 1), which comprises a cylinder having a protuberance defined by an arcuate extension 62 and a vane-like radial offset 64. This feed cylinder 60 is rotated in a counter-clockwise direction as viewed in Figure 1 and constitutes an essential part of the meat feeding means. The outer end of the shaft 54 is likewise unequally cut away so as to be fitted against a corresponding circular segment 55 integral with the feed cylinder 60. This insures correct timing upon assembly.

The meat feeding means includes generally the case 56 in which the cylinder 60 rotates and which case is surmounted by a hopper 66 into which desired portions of ground meat or other material are placed preliminary to and during operation of the machine. This hopper 66 is removably mounted on the top edge of the case 56 by means of integral depending lugs or ears 68. These are shown in Figure 3. Suitable fastening bolts 70 pass through openings in these ears into correspondingly screw-threaded openings adjacent the top edge of the case 56. The hopper 66 may be extended downwardly to include as an integral portion the uppermost part of the case 56, namely, that portion above a pair of shafts 71 and 72, which extend thereinto from the gear case 32. This is for greater ease in cleaning.

These shafts 71 and 72 are driven at desired speeds for meat feeding purposes, by means of certain of the gears 30 in the gear case 32 and are positioned one near each end of the case 56.

The case 56 has integral somewhat semi-circular extensions at its upper portion, one at each end thereof, and each of the shafts 71 and 72 has a series of feed fingers mounted thereon in the shape of pins 73 and 74 respectively. These pins 73 and 74 are adapted to rotatably move through slots 76, in a pair of comb-like stripper elements 78, mounted in the case 56, one adjacent the lower end of each semi-circular extension thereof. The shaft 72 rotates in a clockwise direction as seen in Figures 1 and 2 and the shaft 71 rotates counter-clockwise as seen in Figures 1 and 2 so that meat from the hopper 66 is fed downwardly through the middle portion of the case 56 by means of the feed fingers or pins 73 and 74 and on to the top of the main feed cylinder 60—62—64. The shafts 71 and 72 may be rotated at the same or dissimilar speeds depending somewhat upon the consistency of the ground meat or other material to be fed through the apparatus. The semi-circular extensions of the case 56 are to accommodate the revolving feed pins 73 and 74.

After the meat, or other material, has been fed onto the top of the cylinder 60—62—64 by means of the feed fingers or pins 73 and 74, the counter-clockwise rotation of the feed cylinder, as viewed in Figures 1 and 2, carries the material around and down with a considerable portion of said material ahead of the vane 64. When the parts reach the position shown in Figure 1 the meat, or other material, is beginning to be compressed against the head of a pressure plate 86 mounted on the end of a rod 88 which is slideably fitted in a suitable bearing 190 mounted adjacent the bottom of the case 56.

The end of this rod is contacted by a cross bar forming part of a stirrup element 192 which has one end pivotally mounted on the base 10 and which is impelled into a normal position such as that shown in Figure 1, by means of a helical spring 194, one end of which is connected to the stirrup 192 and the other end connected to the framework of the machine.

Instead of this stirrup and tension spring arrangement, a compression means, such as illustrated in Figures 1, 2 and 3 of my aforesaid patent on "Hamburger Patty Maker," No. 2,413,046, may be employed.

The bottom of the case 56 has an opening therein as indicated by the numeral 57 and the force of spring 194 acting against the pusher plate 86 is such that most of the meat, or other material, impelled against the face of the pusher plate 86 by means of the vane or projection 64 will be pushed downwardly through the opening 57 before the torque of the shaft 54 will suffice to force the pressure plate 86 backwardly against the tension of the spring 194, or other compression means, allowing the vane 64 to pass the upper edge of the pressure plate 86 after which the elements 86—88—92 and 194 will resume their normal position as shown in Figures 1 and 2.

The slide plate 46 has likewise an opening therein as indicated by the numeral 47, and the timing of the mechanism is such that at the time the greatest pressure is being put on the material between the surfaces 64 and 86, this opening 47 in the plate 46 is directly beneath the opening 57 in the bottom of the case 56 so that the meat, or other material, is forced into and fills the opening 47 in the plate 46. This opening is preferably circular and of a diameter calculated to accurately measure a desired amount of meat, or other material, which is to be made into a patty. Any excess material is simply pushed past the pressure plate 86.

The slot 48 which forms part of the connection between the link 44 and the plate 46 enables a momentary pause at this end of the stroke whereby a complete filling action of the opening 47 is assured.

Further movement of the mechanism then carries the plate 46 forwardly until it finally assumes the other extremity of its reciprocatory motion as shown in Figure 2.

At this time the portion of meat, or other material, which has been packed into the opening 47 is automatically removed therefrom by means of an ejecting element, which includes essentially a ring 80. This ring 80 is of only a slightly less diameter than the diameter of the opening 47, because it has been found that the portion of meat, or other material, packed into the opening 47 can be best removed therefrom by a snap action blow, almost the entire force of which is delivered near the periphery of the compacted material.

The ring 80 is supported on an arm 82 which extends to the front face of the mechanism and is then bent downwardly at a right angle as is best shown in Figure 3, thence it passes through a suitable bearing 84 and has its lower end resting against the peripheral face of the cam plate 41. The arm 82 may be made of two parts, with the upper part and ring 80 quickly removable.

A bracket 13 is fitted onto the rod 82 above the bearing 84 and extends downwardly outside the cam plate 41 with its lower end connected to one end of a helical tension spring 15, the other end of which is connected to the base 10 or 11.

The cam plate 41 is rotated by the mechanism in a counter-clockwise direction as viewed in Figures 1 and 2 and the tension of the spring 15 is such that when a notch 43 in the cam plate 41 moves under the end of the rod 82 a sharp downward action results whereby the portion of meat in the opening 47 of the plate 46 is forcibly ejected from the opening. The cam plate further rotates and by means of the cammed face portion 45 then moves the knock-out ring 80 upwardly into its normal position as shown in Figures 1 and 3. The knock-out position is shown in Figure 2.

The ejected portion of meat is delivered onto a sheet of paper on the upper face of a vertically movable molding table 90 provided with a supporting rod 92 fitted into a suitable bearing 94 in the frame of the machine. A guide rod 91 also extends downwardly from the molding table 90 and passes through an opening in part of the frame work of the machine. A tension spring 189 connects the lower end of the guide rod 91 to the base of the machine, whereby the mold-table or compression plate is automatically returned to lower-most position after being raised by the cam 93. The lower end of the supporting rod 92 acts against a cam 93 which is keyed onto the drive shaft 18 and this cam 93 is of such contour and is so fitted on the shaft 18 that the molding table 90 will be at the top of its upward movement at the time that the slide plate is in the position shown in Figure 1. The slot 48 in the end of the operating link 44 allows a momentary pause of this phase of the operation, so that molding is satisfactorily completed.

A hollow mold, preferably circular, is bolted onto the lower face of the slide plate 46 adjacent its outer end as best shown at 96 and the upward movement of the molding table 90 is such that the portion of meat, or other material, which has been deposited thereon by the outward movement of the plate 46 and the action of the knock-out ring 80 will be forced into the hollow under-face of the mold 96 and pressed into desired final dimensions. The volume of the recess in the mold 96 is very slightly larger than the cubical content of the opening 47 although its diameter is greater and thickness correspondingly less. This is necessary in molding ground meat to be used as hamburger patties in that a relatively thin patty of fairly large diameter is most desirable. In other words, the portion of meat is simply preliminarily measured by the capacity of the opening 47 in the slide plate 46 and is finally molded to desired diameter and thickness in the recess in the mold 96 by means of the upward action of the molding table 90.

Obviously some means must be provided for removing the completed molded patty from the recess in the mold 96 and also for carrying it off of the top of the molding table 90 so that succeeding patties may be made. To this end a sheet of paper, preferably waxed paper, is cut from a roll 100, supported on a spindle 102, projecting from the side of the case 32; and a sheet of this waxed paper is delivered onto the top of the molding table 90 for each patty making operation. This is accomplished by means of a feed roll driven by a gear 104 (Figure 3), mounted on a shaft 106, which shaft also supports the feed roll. This gear is continuously rotated at a desired speed by means of intermediate gears 108 and 110, in mesh with a large drive gear 112, which is driven by a set of beveled gears 114 and 116, the gear 114 being mounted on the main drive shaft 18.

As will be best evident from Figure 3, the end of the strip of paper from the roll 100, is fitted beneath the main feed roll mounted on the shaft 106 and between the face of this roller and a tiltable trough-like sheet metal element 118 pivotally mounted at 120 on the frame of the machine. This trough-like element enables a better insertion of the paper around and under the said roll and assures positive action at all times on account of the pressure maintained against that part of the paper on the juxtaposed portion of the feed roll by means of the weight of the trough acting about the pivot point 120. This can be supplemented by an arm 121 to which a spring 119 is attached.

The paper from the roll 100 is then threaded upwardly around the rear end of a plate 122 comprising an extension of the molding table 90, looped, and thence carried downwardly beneath this plate 122 and inwardly over the face of the molding table 90, through a space provided therefor. This leaves a slight loop, or bulge, of the paper 100 just above the rear edge of the plate 122 as shown at 101 in Figure 3.

A recess, tapering upwardly, as shown by the dotted lines 124, in Figure 3, is cut into the under face of the molding table 90 beneath the plate 122 and a feed roller driven by a gear 126 rotates continuously beneath this recess, the upper face of the recess forming an open slot, whereby, when the molding table 90 is allowed to drop downwardly by means of the action of the cam 93, this revolving feed roller will contact the paper and draw it from the roll 100 and then push it outwardly over the upper face of the mold table 90. The diameter of this feed roller is such that it periphery extends silghtly above the upper face of the slot in the molding table, formed by the cut-away portion 124, when the molding table 90 is in its lower-most position, whereby paper pushed against the under face of the plate 122 by this feed roller will be propelled forwardly onto the upper face of the molding table 90. Both feed rollers are preferably of sponge rubber or material of some similar consistency. The plate 122 is removably mounted on the extension of the molding table 90 by means of bolts having knurled heads 130.

The diameter and speed of the feed roller driven by the gear 126, is such that a length of paper just sufficient to cover the operating portion of the upper face of the mold-table 90 beneath the mold 96, is pushed outwardly over the mold-table at each operation of the machine, and while the mold-table is in its lowermost position. This length of paper is provided for by the loop of paper adjacent the edge of plate 122 (Figure 3). This length of paper is then automatically cut off by means of a serrated cutter blade 132 removably, but fixedly, mounted in the frame portion of the machine by end extensions 133.

This cutter blade 132 projects upwardly through a corresponding slot formed in the molding table 90 and the paper is threaded beneath the serrated cutting edge of the blade 132 when inserted in the machine. Each upward operation of the mold table 90 severs a corresponding length of paper inasmuch as the serrated cutting face of the blade 132 is wholly below the upper face of the mold table 90 when the mold table 90 is in its uppermost position as shown in Figures 1 and 3. Accordingly each completed patty is deposited and molded upon an individual sheet of waxed paper automatically cut to proper size.

In order to remove the completed molded patty from the recess in the mold 96, a repeating mold liner 81 is provided, this comprising essentially a sheet of impregnated water and greaseproof cloth similar to the mold lining sheet shown at 81 in my prior Patent No. 2,338,939. In the present invention this mold lining sheet 81 is shown as having one end affixed to a support 83 mounted on the frame of the machine and the sheet 81 then extends forwardly around the front sharpened or bevelled edge of the slide plate 46, thence adapted to be carried rearwardly and beneath the recessed mold 96. The mold liner sheet 81 has a hem formed in its free end as shown at 85 and a rod 87 is passed through this hem, each end of this rod being attached to a coiled spring 89, the other ends of these springs being affixed to the frame of the machine alongside the slide plate 46 and preferably adjacent the corresponding faces of the case 56. This mold liner sheet 81, being pulled around the under face of the plate 46 by means of the action of the springs 89 will therefore always be beneath the recessed mold 96 when the slide plate 46 is in retracted position as shown in Figure 1 and will then be above the portion of meat which has just been deposited upon the paper on the mold-table 90, by means of the action of the knock-out ring 80. Therefore, when the mold table 90 is pushed upwardly by the action of the cam 93, the portion of meat, or other material, will be compressed between the sheet of waxed paper which is on the upper face of the mold-table 90 and the mold liner sheet 81, which has been pulled by the meat into the recess in the mold 96. The meat, or other material, which is within the mold recess accordingly does not contact any metal at this time, but is between the sheet of waxed paper on its under face and the impregnated cloth 81 on its upper face. The recess in the mold 96 is made slightly oversize so as to provide for the volume of that part of the mold liner sheet 81 which is between its under face and the meat at each operation. The sheet 81 is sufficiently flexible however, so that a perfectly molded patty results from the molding action of the mold-table 90 and the recessed mold 96. Cam 93 allows the table 90 to move downwardly in time and the spring 189 assures this timed downward movement.

After the molding action is completed and the slide plate 46 again moves outwardly into the position shown in Figure 2, the mold liner sheet 81 is pulled around the projecting forward sharpened edge of the plate 46 as shown in Figure 2 against the tension of the springs 89 and the character of the meat being slightly sticky, the completed patty adheres to the under face of the mold liner 81 until such time as the mold liner is pulled around the forward thin edge of the plate 46, whereupon the completed patty with the sheet of wax paper adhering to its under face is dropped from under the mold liner. The meat is never so sticky that it will follow the mold-liner upwardly and rearwardly around the sharp leading edge of the plate 46. Continuance of this action results in a stacking of the completed patties, outside the machine, upon a suitable support which may be provided therefor.

I am aware that many changes may be made and numerous details of construction varied throughout a wide range without departing from the principles of this invention, and, I, therefore, do not propose limiting the patent granted hereon otherwise than as necessitated by the prior art.

I claim as my invention:

1. A material measuring and shaping machine including a hopper, a measuring means associated with the hopper, means in the hopper for feeding material therefrom into the measuring means, and a shaping means associated with the measuring means, said shaping means including a recessed mold on the measuring means.

2. A material portioning and shaping machine including a hopper, a portioning means associated with the hopper, means in the hopper for feeding material therefrom into the portioning means, a shaping means associated with the portioning means, said shaping means including a recessed mold on the portioning means, and means for removing the molded material from the recessed mold.

3. A material measuring and shaping machine including a hopper, a measuring means associated with the hopper, means in the hopper for feeding material therefrom into the measuring means, a shaping means associated with the measuring means, said shaping means including a recessed mold on the measuring means, means for removing the molded material from the recessed mold, and means for operating the feed, measuring, shaping and removing means in timed unison.

4. A material portioning and shaping machine including a hopper, a portioning means associated with the hopper, means in the hopper for feeding material therefrom into the portioning means, a shaping means associated with the portioning means, said shaping means including a recessed mold on the portioning means, and means for removing the molded material from the recessed mold, said removing means including a flexible sheet.

5. A material portioning and shaping machine including a hopper, a portioning means associated with the hopper, means in the hopper for feeding material therefrom into the portioning means, a shaping means associated with the portioning means, said shaping means including a recessed mold on the portioning means, means for ejecting the shaped material from the recessed mold, the ejecting means including a flexible sheet associated with the recessed mold, and means for shifting the flexible sheet into and out of operating relationship with the recessed mold.

6. A material measuring and shaping machine including a hopper, a portioning means associated with the hopper, means in the hopper for feeding material therefrom into the portioning means, a shaping means associated with the portioning means, said shaping means including a recessed mold on the portioning means, means for removing the molded material from the recessed mold, said removing means including a flexible sheet associated with the recessed mold, means for shifting the flexible sheet into and out of operating relationship with the recessed mold, and means for stripping the molded material from said flexible sheet, said means comprising a relatively sharp edge about which the flexible sheet is drawn in its removing movement.

7. A material measuring and shaping machine including a hopper, a portioning means associated with the hopper, means in the hopper for feeding material therefrom into the portioning means, a shaping means associated with the portioning means, said shaping means including a recessed mold on the portioning means, means for removing the molded material from the recessed mold, said removing means including a flexible sheet associated with the recessed mold, means for shifting the flexible sheet into and out of operating relationship with the recessed mold, means for stripping the molded material from said flexible sheet, said means comprising a relatively sharp edge about which the flexible sheet is drawn in its removing movement, said relatively sharp edge being positioned on the portioning means adjacent the recessed mold.

8. A patty molding machine including a feed means for the material to be formed into patties, a reciprocating slide-plate having an opening therein mounted beneath the feed means, the opening being provided in the slide-plate for receiving a predetermined quantity of material from the feed means, and a recessed mold mounted on the slide-plate for finally shaping the measured portion.

9. A patty molding machine including a feed means for the material to be formed into patties, a reciprocating plate having an opening therein mounted beneath the feed means, the opening being provided in the plate for receiving a predetermined quantity of material, a recessed mold mounted on the plate for finally shaping the measured portion, and a vertically reciprocatable molding table mounted beneath said plate.

10. A patty molding machine comprising a feed means, a reciprocating slide having an opening therein mounted beneath the feed means, the opening being provided in the slide for receiving a measured portion of material from the feed means, a recessed mold mounted on the slide for finally shaping the measured portion, a vertically reciprocatable mold-table mounted beneath the slide, and means for reciprocating the slide and moving the mold-table in timed relationship.

11. A patty molding machine comprising a feed means for the material to be formed into patties, a reciprocating slide having an opening therein mounted beneath the feed means, the opening being provided in the slide for receiving a predetermined quantity of material, a recessed mold mounted under the slide for finally shaping the measured portion, a vertically reciprocatable mold-table mounted beneath the slide, means for reciprocating the slide and moving the mold table in timed relationship, and means for removing the molded patty from the recessed mold.

12. A patty molding machine comprising a feed means for the material to be formed into patties, a reciprocating slide having an opening therein mounted beneath the feed means, the opening being provided in the slide for receiving a predetermined quantity of material, a recessed mold mounted on the slide for finally shaping the measured portion, a vertically reciprocatable mold-table mounted beneath the slide, means for reciprocating the slide and moving the mold table in timed relationship, and means for removing the molded patty from the recessed mold, said removing means including a flexible sheet mounted adjacent the mold.

13. A patty molding machine comprising a feed means for the material to be formed into patties, a reciprocating slide having an opening therein mounted beneath the feed means. The opening being provided in the slide for receiving a predetermined quantity of material, a recessed mold mounted on the slide for finally shaping the measured portion, a vertically reciprocatable mold-table mounted beneath the slide, means for reciprocating the slide and moving the mold table in timed relationship, means for removing the molded patty from the recessed mold, said removing means including a flexible sheet mounted adjacent the mold, and means for moving the flexible sheet beneath the mold preliminary to each molding operation.

14. A patty molding machine comprising a feed means for the material to be formed into patties, a reciprocating slide having an opening therein mounted beneath the feed means, the opening being provided in the slide for receiving a predetermined quantity of material from the feed means, a recessed mold mounted on the under face of the slide for finally shaping the measured portion, a vertically reciprocatable mold-table mounted beneath the slide, means for removing the molded patty from the recessed mold, said removing means including a flexible sheet mounted adjacent the mold, and means for moving the flexible sheet beneath the mold preliminary to each molding operation, said last means also operating to move the sheet out from under the mold subsequent to each molding operation.

15. A patty machine including a feed hopper a reciprocating slide mounted below the hopper, the slide having an opening therein for the reception of ground meat fed through an opening in the bottom of the hopper, a recessed mold mounted on the forward end of the slide, and means for transferring meat from the opening in the slide to the recessed mold.

16. A patty machine including a feed hopper having an opening in the bottom thereof, a reciprocating slide mounted below the hopper, the slide having an opening therein for the reception of ground meat fed through the opening in the bottom of the hopper, a recessed mold mounted on the forward end of the slide, and means for transferring meat from the opening in the slide to the recessed mold and shaping the same, said means including a knock-out ring cooperating with the slide and a mold table cooperating with the recessed mold.

HARRY H. HOLLY.

REFERENCES CITED

The following references are of record in the file of this patent:

UNITED STATES PATENTS

| Number | Name | Date |
|---|---|---|
| 278,126 | Glisson | May 22, 1883 |
| 1,138,369 | Feeley | May 4, 1915 |
| 1,288,025 | Kennedy | Dec. 17, 1918 |
| 1,963,718 | Schatz | June 19, 1934 |
| 2,257,536 | Feurt | Sept. 30, 1941 |
| 2,299,314 | Elesh et al. | Oct. 20, 1942 |
| 2,338,939 | Holly | Jan. 11, 1944 |
| 2,413,046 | Holly | Dec. 24, 1946 |